(12) United States Patent
Rowson et al.

(10) Patent No.: US 9,253,626 B2
(45) Date of Patent: Feb. 2, 2016

(54) METHOD AND SYSTEM FOR OPTIMIZING PERFORMANCE OF APPLICATIONS ON A WIRELESS COMMUNICATION DEVICE

(75) Inventors: Sebastian Rowson, San Diego, CA (US); Laurent Desclos, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 580 days.

(21) Appl. No.: 13/558,306

(22) Filed: Jul. 25, 2012

(65) Prior Publication Data

US 2013/0109370 A1 May 2, 2013

Related U.S. Application Data

(60) Provisional application No. 61/511,118, filed on Jul. 25, 2011.

(51) Int. Cl.
*H04W 8/22* (2009.01)
*H01Q 1/24* (2006.01)
*H01Q 9/42* (2006.01)
*H01Q 19/32* (2006.01)

(52) U.S. Cl.
CPC .............. *H04W 8/22* (2013.01); *H01Q 1/243* (2013.01); *H01Q 9/42* (2013.01); *H01Q 19/32* (2013.01)

(58) Field of Classification Search
CPC ........................................ H04W 8/22
USPC .................................. 455/418–450
See application file for complete search history.

(56) References Cited

U.S. PATENT DOCUMENTS

2009/0298418 A1* 12/2009 Michael et al. ............ 455/3.04
2010/0172268 A1* 7/2010 Reudink ...................... 370/254

* cited by examiner

*Primary Examiner* — Michael T Vu
(74) *Attorney, Agent, or Firm* — Coastal Patent Law Group, P.C.

(57) ABSTRACT

A system and method for optimizing performance of an application are provided. The system includes an application processor including a logic section, multiple peripherals coupled to the application processor, and an antenna system coupled to some of the peripherals, where the antenna system includes multiple antennas including one or more modal antennas. Each of the one or more modal antennas has multiple modes corresponding to multiple radiation patterns, respectively. The logic section controls the antenna system to have a configuration that optimizes gain associated with networks and performance of the application selected for a time period.

32 Claims, 6 Drawing Sheets

METHOD AND SYSTEM FOR OPTIMIZING PERFORMANCE OF APPLICATIONS ON A WIRELESS COMMUNICATION DEVICE

CROSS-REFERENCE TO RELATED APPLICATIONS

This application claims benefit of priority to U.S. Provisional Application Ser. No. 61/511,118, filed Jul. 25, 2011, and titled "METHOD AND SYSTEM FOR OPTIMIZING PERFORMANCE OF APPLICATIONS ON A WIRELESS COMMUNICATION DEVICE"; the contents of which are hereby incorporated by reference.

BACKGROUND OF THE INVENTION

1. Field of the Invention

The present invention relates to a system and method for optimizing performance of applications on a wireless communication device.

2. Description of the Related Art

As new generations of handsets, laptops, tablets and other wireless communication devices become smaller and embedded with increased applications, new antenna designs are required to address inherent limitations of these devices and to enable new capabilities. For example, in a conventional wireless communication device, signals in the networks are processed separately through separate RF chains coupled to respective antennas. The individual RF chains are controlled separately by an application processor, and thus adjustment and fine tuning for improved performance are not considered in running applications.

On the other hand, users are increasingly demanding in obtaining high quality experiences with applications such as in the arena of mobile entertainment. Applications on a wireless communication device include video viewing, digital media downloading, games, navigations and various others. In running such an application, the user's satisfaction is determined by certain metrics such as how good the response is to user's commands in the game, how fluid the video stream is without choppiness or freezing during the video viewing or media downloading, for example. Thus, new functions and capabilities of adjusting and fine tuning are needed to optimize the performance of applications in the wireless communication platform.

SUMMARY OF THE INVENTION

A wireless communication system and method for optimizing performance of an application are provided. The system includes an application processor including a logic section, multiple peripherals coupled to the application processor, and an antenna system coupled to some of the peripherals, where the antenna system includes multiple antennas including one or more modal antennas. Each of the one or more modal antennas has multiple modes corresponding to multiple radiation patterns, respectively. The logic section controls the antenna system to have a configuration that optimizes gain associated with networks and performance of the application selected for a time period.

The antenna system may include an antenna logic section that communicates with the logic section, and may be associated with an RF circuitry that is coupled to the two or more of the multiple peripheral elements as well as to the multiple antennas.

The application processor may further comprise multiple interfaces coupled to the multiple peripheral elements, respectively, and to one or more processors. The logic section is configured to receive information from the multiple interfaces, the one or more processors and the antenna logic section. Based on the information, the logic section controls the antenna system to have the configuration that optimizes the gain associated with the networks and the performance of the application selected for the time period.

The logic section may control the antenna system by controlling components in the RF circuitry to adjust one or more of properties such as signal frequencies and impedances. The logic section may also control the antenna system by selecting a mode from each of the one or more modal antennas.

The logic section is configured to receive at least part of the information on wireless communication factors including the networks, environment and antenna characteristics.

The two or more of the multiple peripheral elements may be two or more basebands associated with the networks, respectively, the networks including two or more of LAN, WAN, PAN, and GPS.

The antenna logic section is configured to store the antenna characteristics such as radiation patterns, directivity and efficiency of each of the multiple antennas, and coupling coefficients between antennas, for example.

The multiple peripheral elements may include one or more sensors that detect at least part of the environment.

The logic section is configured to receive at least part of the information in terms of channel quality metrics such as data rate, signal-to-noise ratio (SNR), received signal strength indicator (RSSI), signal-to-interference-plus-noise ratio (SINR), and throughput.

The logic section is configured to control the antenna system to have the configuration that optimizes the gain associated with networks by testing multiple configurations of network connections.

In one example, the application is video streaming or digital media downloading. Based on information from a video processor, the logic section controls the antenna system to have the configuration that optimizes the performance of the application by selecting a mode associated with one of the one or more modal antennas during each time interval to have a reliable link for obtaining a fluid media stream.

In another example, the application is a game. Based on information from a video processor and/or an image processor, the logic section controls the antenna system to have the configuration that optimizes the performance of the application by selecting a mode associated with each of the one or more modal antennas to reduce coupling to the antenna used for the application for optimizing interaction between the game and a user.

A method of optimizing performance of an application on a wireless communication system includes steps of providing an antenna system including multiple antennas including one or more modal antennas, wherein each of the one or more modal antennas has multiple modes corresponding to multiple radiation patterns, respectively, receiving information on wireless communication factors including networks, environment and antenna characteristics, first configuring the antenna system based on at least part of the information to use a network connection that optimizes gain, monitoring the performance of the application based on feedback information; and second configuring the antenna system based on at least part of the feedback information to optimize the performance of the application.

The method may repeat the receiving, first configuring, and second configuring steps if a change in performance is detected in the monitoring step. Alternatively, the method may repeat the second configuring step if a change in performance is detected in the monitoring step.

The method may further include a step of storing the antenna characteristics such as radiation patterns, directivity and efficiency of each of the multiple antennas, and coupling coefficients between antennas.

The method may further include a step of sensing at least part of the environment.

In the method, the first configuring step and/or the second configuring step comprises controlling components in the RF circuitry to adjust one or more of properties such as signal frequencies and impedances.

In the method, the first configuring step and/or the second configuring step comprises selecting a mode from each of the one or more modal antennas.

In the method, the feedback information includes channel quality metrics such as data rate, signal-to-noise ratio, received signal strength indicator, signal-to-interference-plus-noise ratio, and throughput.

In the method, the first configuring step includes testing multiple configurations of network connections to have the configuration that optimizes the gain associated with the networks.

In one example, the application is video streaming or digital media downloading. In this case, the second configuring step includes selecting a mode associated with one of the one or more modal antennas during each time interval to have a reliable link for obtaining a fluid media stream based on the feedback information from a video processor.

In another example, the application is a game. In this case, the second configuring step includes selecting a mode associated with each of the one or more modal antennas to reduce coupling to the antenna used for the application for optimizing interaction between the game and a user based on the feedback information from a video processor and/or an image processor.

A method of optimizing performance of multiple applications sequentially on a wireless communication system is provided. The method includes a step of managing the multiple applications based on information on one or more of priorities and preferences to select an application for a time period, and a step of monitoring the information. The optimization process for the selected application proceeds similar to the aforementioned optimization method. The managing step is repeated to select another application if a change in the information is detected in the monitoring step. The preferences and priorities are based, for example, on a use history, user's inputs, applications settings, rules and conditions, and a predetermined sequence of two or more of the applications.

BRIEF DESCRIPTION OF THE DRAWINGS

The characteristics and advantages of this invention will be more apparent from the following detailed description when read in conjunction with the accompanying drawings, in which.

DETAILED DESCRIPTION

An application processor is designed for certain applications on laptops, cellular telephones, tablets and other mobile devices, enabling multimedia applications and other functions while running a complex operating system. An application processor is a central element controlling various peripheral components and modules such as a screen, a keyboard, a modem, a camera, a speaker, etc. This document concerns a section of the device that is related to multiple wireless communications and associated applications.

Figure 1:
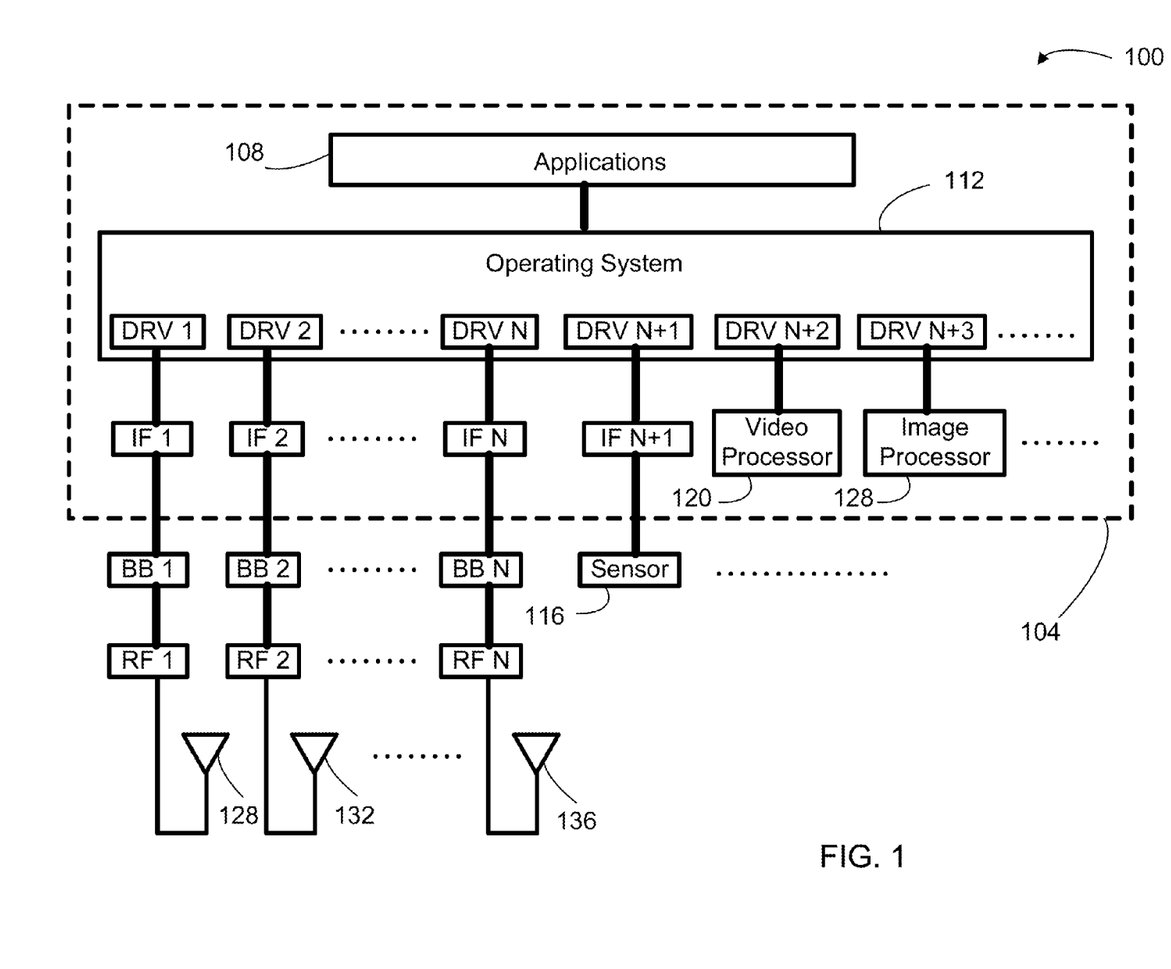
FIG. 1 illustrates an example of a wireless communication system based on a conventional architecture.

FIG. 1 illustrates an example of a wireless communication system 100 based on a conventional architecture. The system 100 includes an application processor 104 that is coupled to various peripherals to enable communication functions and associated applications. The central core of the application processor 104 may include an applications section 108 and an operating system 112. The applications section 108 categorizes, prepares and sets stages for applications that the system 100 is supposed to offer, for example, emails, phone calls, videos, text messages, navigation, games, file downloading and uploading, and so on. The operating system 112 may be based on Windows®, LINUX® or any other operating systems as long as supported by the application processor 104. Each application is processed in the operating system 112 through, for example, a framework layer and associated libraries therein. The operating system 112 further includes software drivers, labeled DRV 1, DRV 2 . . . DRV N, DRV N+1, DRV N+2, DRV N+3 . . . in the figure, which are coupled to interfaces and processors in the application processor 104 to enable operations with peripherals external to the application processor 104. The communications between the drivers and the interfaces and processors may be controlled by a hardware arbitration layer in the operating system 112. In the example of FIG. 1, the drivers DRV 1, DRV 2 . . . and DRV N are coupled to the interfaces IF 1, IF 2 . . . and IF N, to enable operations with basebands BB 1, BB 2 . . . and BB N, respectively. Further, in the example of FIG. 1, the (N+1)-th driver, DRV N+1, is coupled to the (N+1)-th interface, IF N+1, to enable operations with a sensor 116. The sensor 116 may be a motion sensor, a light sensor, a proximity sensor or other type of sensors. Further, in the example of FIG. 1, the (N+2)-th driver, DRV N+2, is coupled to a video processor 120 to process video streams. Similarly, the (N+3)-th driver, DRV N+3, is coupled to an image processor 128 to process images. In the present example, the application processor 104 is coupled to external peripherals including basebands BB 1, BB 2 . . . and BB N, the sensor 116 and other peripherals.

Each of the basebands BB 1, BB 2 . . . and BB N may be specific to Local Area Network (LAN), Wide Area Network (WAN), Personal Area Network (PAN), Global Positioning System (GPS) or other type of communication networks. These basebands are coupled to antennas 128, 132 . . . and 138 through RF circuits, labeled RF 1, RF 2 . . . and RF N in the figure, respectively. Each of the RF circuits includes power amplifiers, filters, duplexers, low noise amplifiers, matching networks and various other components to process transmit and receive signals.

In the conventional architecture of the system 100, as illustrated in FIG. 1, the signals in the networks are processed separately through separate RF chains coupled to respective antennas 128, 132 . . . and 136. The individual RF chains are controlled separately by the application processor 104, and thus adjustment and fine tuning for improved performance are not considered. To achieve better user experiences through various performance optimizations, an antenna system that can be dynamically adjusted may be implemented. Such an antenna system may be configured to include modal antennas that can be actively controlled for different beam steering directions, for example, and can be implemented as a "plug and play" solution to replace the conventional antennas 128, 132 . . . and 136 coupled respectively to the RF circuits RF 1, RF 2 . . . and RF N. A modal antenna, also referred to as a null-steering antenna, can generate multiple modes corresponding to multiple radiation patterns, equivalent to having a set of antennas with the same feed. Examples of structures and implementations of the modal antennas are provided in U.S. Pat. No. 7,911,402, entitled "ANTENNA AND METHOD FOR STEERING ANTENNA BEAM DIRECTION," issued on Mar. 22, 2011. The contents of the above patent are incorporated herein by reference and are summarized as follows.

Figure 2:
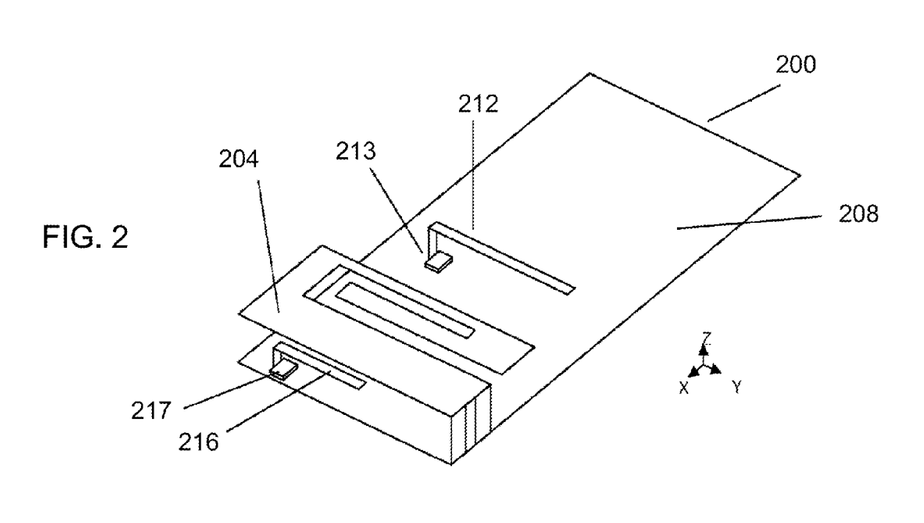
FIG. 2 illustrates an exemplary modal antenna.
Figure 3A:
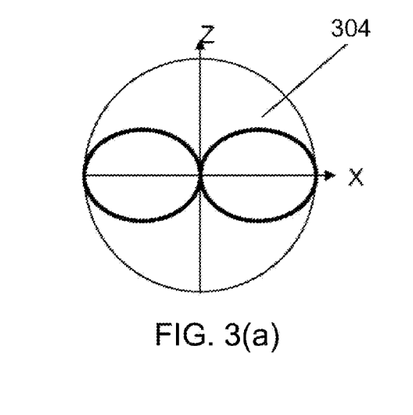
FIG. 3(a) illustrates a radiation pattern associated with the modal antenna in the first state.
Figure 3B:
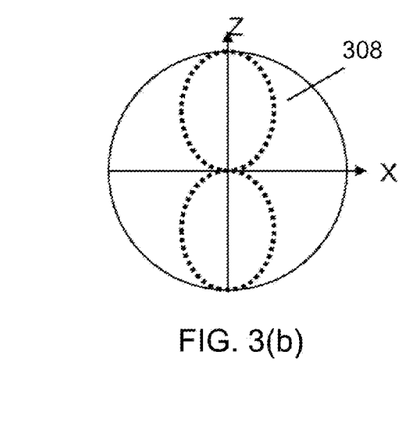
FIG. 3(b) illustrates a radiation pattern associated with the modal antenna in the second state.

FIG. 2 illustrates an exemplary modal antenna 200, which includes an Isolated Magnetic Dipole™ (IMD) element 204 placed on a ground plane 208, a first parasitic element 212 coupled to an first active element 213, and a second parasitic element 216 coupled to a second active element 217. The active elements 213 and 217 may include switches that either electrically connect (short) or disconnect (open) the parasitic elements 212 and 216 to the ground plane 208. This structure allows for two different modes of operation with a common frequency corresponding to a first state where the parasitic elements 212 and 216 are shorted to the ground and a second state where the parasitic elements 212 and 216 are open. FIG. 3(a) illustrates a radiation pattern 304 associated with the modal antenna 200 in the first state; and FIG. 3(b) illustrates a radiation pattern 308 in the second state, which shows a ninety-degree shift in direction as compared to the radiation pattern 304. Thus, by controlling the active elements 213 and 217 of the modal antenna 200, the operation of two modes can be obtained at the same frequency. The control scheme can be extended for multi-mode operations by incorporating, for example, tunable elements in the active elements for variable control and additional active elements for matching. Examples of these active elements include switches, tunable capacitors, tunable phase shifters, diodes, micro-electro-mechanical system (MEMS) switches, MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Figure 4:
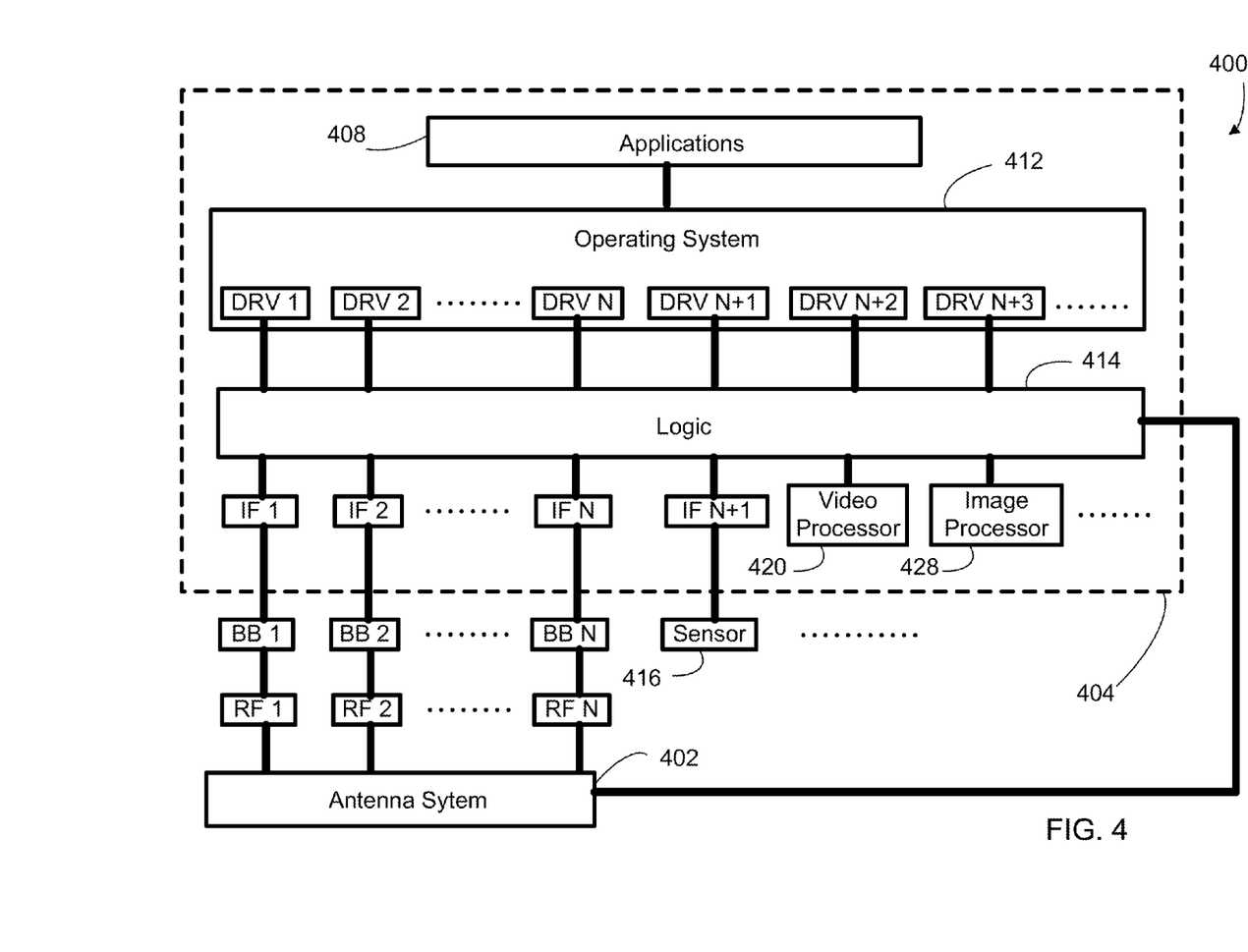
FIG. 4 illustrates an example of a wireless communication system based on an architecture incorporating an antenna system that is adjustable for performance optimization.

FIG. 4 illustrates an example of a wireless communication system 400 based on an architecture incorporating an antenna system 402 that is adjustable for performance optimization. The system 400 includes elements similar to those in the system 100 of FIG. 1. Specifically, the system 400 includes an application processor 404 that is coupled to various peripherals to enable communication functions and associated applications. The central core of the application processor 404 may include an applications section 408 and an operating system 412. The applications section 408 categorizes, prepares and sets stages for applications that the system 400 is supposed to offer, for example, emails, phone calls, videos, text messages, navigation, games, and so on. The operating system 412 may be based on Windows®, LINUX® or any other operating systems as long as supported by the application processor 404. Each application is processed in the operating system 412 through, for example, a framework layer and associated libraries therein. Similar to the operation system 112 in the system 100 of FIG. 1, the operating system 412 further includes software drivers, labeled DRV 1, DRV 2 . . . DRV N, DRV N+1, DRV N+2, DRV N+3 . . . in the figure, which are coupled to interfaces and processors in the application processor 404 to enable operations with peripherals external to the application processor 404. In the system 400 of FIG. 4, the communications between the drivers and the interfaces and processors are controlled by a logic section 414 in the application processor 404. Specifically, the drivers DRV 1, DRV 2 . . . and DRV N are coupled to the interfaces IF 1, IF 2 . . . and IF N through the logic section 414 to enable operations with basebands BB 1, BB 2 . . . and BB N, respectively. Further, in this example, the (N+1)-th driver, DRV N+1, is coupled to the (N+1)-th interface, IF N+1, through the logic section 414 to enable operations with a sensor 416. More than one sensor can be coupled to the logic section 414 through proper interfaces. These sensors may be a motion sensor, a light sensor, a proximity sensor or other type of sensors. Further, in this example, the (N+2)-th driver, DRV N+2, is coupled to a video processor 420 through the logic section 414 to process video streams. Similarly, the (N+3)-th driver, DRV N+3, is coupled to an image processor 428 through the logic section 414 to process images. Similar to the system 100 in FIG. 1, the application processor 404 is coupled to external peripherals including basebands BB 1, BB 2 . . . and BB N, the sensor 416 and other peripherals.

Each of the basebands BB 1, BB 2 . . . and BB N may be specific to Local Area Network (LAN), Wide Area Network (WAN), Personal Area Network (PAN), Global Positioning System (GPS) or other type of communication networks. These basebands are coupled to the antenna system 402, which is coupled to the logic section 414 that controls the antenna system 402 for adjustment and fine tuning for performance optimization. An RF circuitry is associated with the antenna system 402 and coupled to the basebands. The RF circuitry may be separately configured for individual chains as indicated by RF 1, RF 2 . . . and RF N, coupled respectively to BB 1, BB 2 . . . and BB N. Part or all of the RF circuitry may be located in the antenna system 402, or outside the antenna system 402. The RF circuitry include power amplifiers, filters, duplexers, low noise amplifiers, matching networks and various other components to process transmit and receive signals.

Figure 5:
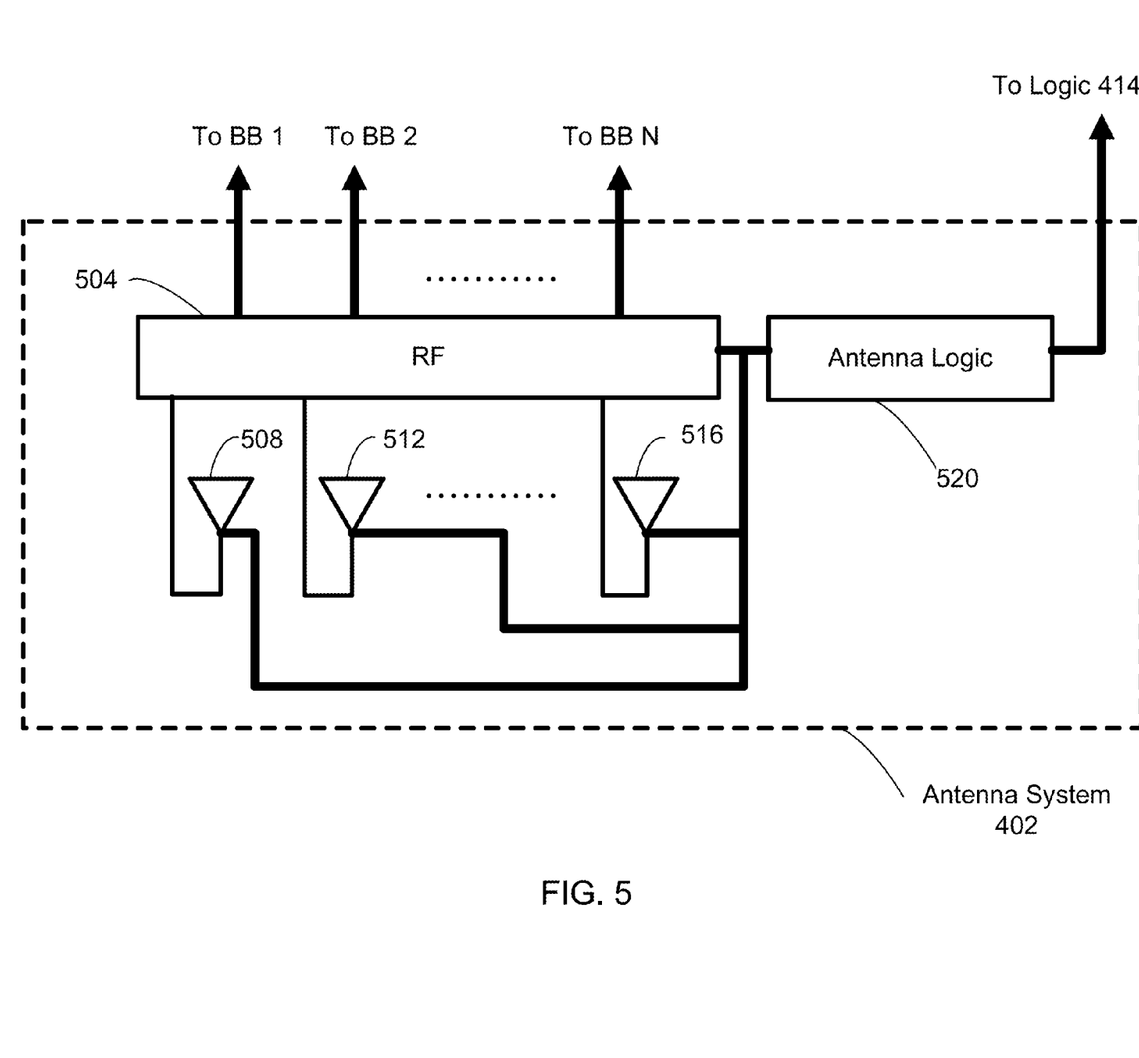
FIG. 5 illustrates an exemplary configuration of the antenna system in the system of FIG. 4.

FIG. 5 illustrates an exemplary configuration of the antenna system 402 in the system 400. The antenna system 402 includes an RF circuit 504 coupled to the basebands BB 1, BB 2 . . . and BB N. This example shows the case of including part or all of the RF circuitry in the antenna system 402 to form the RF circuit 504. The RF circuit 504 includes components to process signals transmitted or received by multiple antennas 508, 512 . . . and 516, which may include one or more modal antennas. The antenna system 402 further includes an antenna logic section 520, which communicates with the logic section 414 in the application processor 404. Based on the communication between the logic section 414 and the antenna logic section 520, the logic section 414 is configured to control the components in the RF circuitry to adjust certain properties such as signal frequencies and impedances. Based on the communication between the logic section 414 and the antenna logic section 520, the logic section 414 further controls the multiple antennas to select a mode from each modal antenna. In the example of FIG. 5, the antennas 508, 512 and 516 are configured to be modal. In each modal antenna, active elements, such as switches 213 and 217 in the modal antenna 200 of FIG. 2, can be controlled by the logic section 414 to select a mode corresponding to a specific radiation pattern. The control information from the logic section 414 may be locally translated by the antenna logic section 520.

The primary roles of the logic section 414 include controlling the antenna system 402 through communications with the multiple interfaces and processors in the application processor 404 as well as the antenna logic section 520 local to the antenna system 402. This logic section 414 may be implemented by designing an ASIC or a low layer software program to work with the operating system 412 and other parts of the application processor 404. The logic section 414 is configured to receive information regarding networks, environment, antenna characteristics and other wireless communication factors. For example, the information may include available networks and associated frequency bands, nominal signal speed on a network connection such as a high speed LAN, locations of base stations such as distances between the handset and the base stations, interference-causing environment such as the placement of a head, a hand, a metal piece or other objects in the proximity, antenna characteristics such as radiation patterns, directivity and efficiency, and coupling between antennas. Some of the information, such as radiation patterns, directivity and efficiency of each antenna, coupling coefficients and other antenna parameters under various use conditions may be pre-stored in the antenna logic section 520. Based on the information, the logic section 414 first configures the antenna system 402 to use a network connection that can provide the optimum gain in dB. This can be done by testing possible configurations of available network connections, for example. During the time when the user runs an application, the logic section 414 monitors the performance of the application based on feedback information received from the interfaces and processors in the application processor 404 that are coupled to the external peripherals as well as from the antenna logic section 520 in the antenna system 402. The feedback information may be in terms of parameters such as data rate in bits per second (bps), signal-to-noise ratio (SNR), received signal strength indicator (RSSI), signal-to-interference-plus-noise ratio (SINR), throughput and various other channel quality metrics. Thereafter, the logic section 414 communicates with the interfaces and processors in the application processor 404 as well as with the antenna logic section 520 in the antenna system 402, to reconfigure the antenna system 402 so as to achieve the optimum performance during the time period when the specific application is activated.

Figure 6:
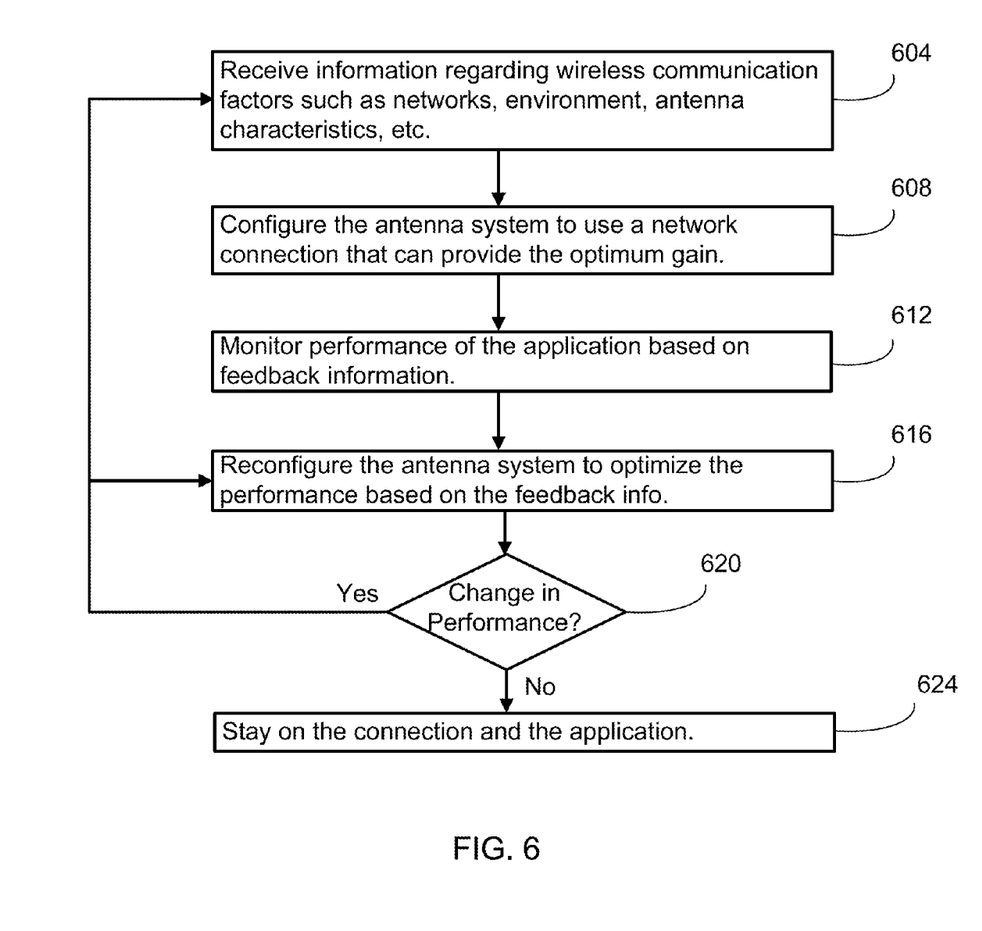
FIG. 6 is a process flow chart illustrating the performance optimization of an application based on the wireless communication system incorporating the adjustable antenna system.

FIG. 6 is a process flow chart illustrating the performance optimization of an application based on the wireless communication system 400 incorporating the adjustable antenna system 402. In the step 604, information is received regarding networks, environment, antenna characteristics and other wireless communication factors. For example, the information may include available networks and associated frequency bands, nominal signal speed on a network connection such as a high speed LAN, locations of base stations such as distances between the handset and the base stations, interference-causing environment such as the placement of a head, a hand, a metal piece or other objects in the proximity, antenna characteristics such as radiation patterns, directivity and efficiency, and coupling between antennas. Some of the information, such as antenna directivity and efficiency of each antenna, coupling coefficients between antennas and other antenna parameters under various use conditions may be pre-stored in the antenna logic section 520. Based on the information, in the step 608, the antenna system 402 is configured to use a network connection that can provide the optimum gain in dB. This can be done by testing possible configurations of available network connections, for example. During the time when the user runs a selected application, in the step 612, the performance of the application is monitored based on feedback information received from the interfaces and processors in the application processor 404 that are coupled to the external peripherals as well as from the antenna logic section 520 in the antenna system 402. The feedback information may be in terms of parameters such as data rate in bits per second (bps), signal-to-noise ratio (SNR), received signal strength indicator (RSSI), signal-to-interference-plus-noise ratio (SINR), throughput and various other channel quality metrics. Thereafter, in the step 616, the antenna system 402 is reconfigured so as to achieve the optimum performance during the time period when the specific application is activated. The performance of the application is monitored, and if a change or degradation is detected at the step 620, the antenna system is reconfigured to recover the optimum performance based on the feedback information. If the change or degradation is detected to be network-connection related, for example, signal fading on the network connection, information regarding the wireless communication factors is re-acquired and the antenna system is reconfigured to use a different network connection that can provide the optimum gain. Unless a change in performance is detected, the system stays on the network connection and the application as indicated by the step 624.

For example, a user selects an application of video streaming or digital media downloading, wherein the quality of user experience depends on how fluid the media stream is. The video processor 420 may report to the logic section 414 the data rate in bps and buffering and pausing information in terms of RSSI, for example. In this case, the buffering and pausing information, such as the frequency and interval based on the time-varying RSSI, is a metric that is more important than the data rate for better user experiences. This is because obtaining a continuous media stream without choppiness or freezing is essential to the user's enjoyment, while the speed of incoming media data is irrelevant. The logic section 414 then communicates with the antenna logic section 520 to select a mode with an optimum radiation pattern to provide a reliable link with good signal strength during each time interval for obtaining a fluid media stream throughout the viewing period.

In another example, a user selects an application of gaming, wherein good interaction between the game and the user, such as good response to user's commands, is essential to the user's experience. The video processor 420 and/or the image processor 428 may report to the logic section 414 the latency rates, throughputs and data rates, for example. In this case, the latency rate is a metric that is more important than the throughput or data rate. Supposing the game is on one baseband, such as LAN, the response can be improved by optimizing parameters of the modal antenna associated with the LAN connection by changing the other antennas to different modes so as to minimize the coupling to the LAN antenna. Coupling coefficients under each use condition may be computed and pre-stored in the antenna logic section 520, along with other modal antenna data such as individual radiation patterns, directivity, efficiency and so on in a look-up table format, for example.

In the optimization process illustrated in FIG. 6 as well as in the above examples, a specific application is selected to run during a certain time period, and the optimization of performance is carried out for the selected application. There are instances where a user is running multiple applications in parallel, hopping from one to another depending on his/her preference or priority. For example, the user may be running a game while receiving a phone call. Depending on who the caller is, he/she may prefer to stay on the game or pick up the call. Additional to user's preferences or priorities, the system may be configured to store user's preferences or priorities based on the use history or inputs from the user. The system may also be configured to establish priorities based on application settings, rules and other conditions. The priorities established by the system may be originally included as default, and may be configured to be updated from time to time. A preferred sequence of certain applications may also be pre-stored by the user or by the system. Instead of pre-storing, part of the necessary information may be acquired when the user is using the communication device. Such functions associated with managing applications may be incorporated in the application processor, for example, with the operating system therein. As the application shifts from one to another, the optimization process needs to be changed since the parameters indicating the performance level may differ from application to application.

Figure 7:
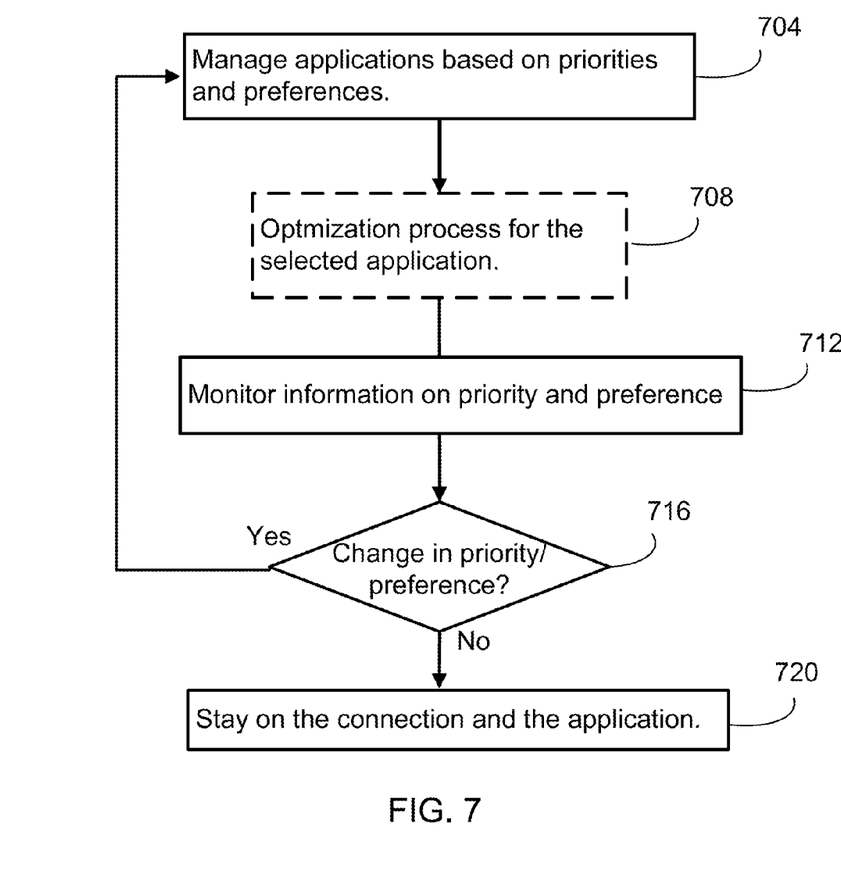
FIG. 7 is a process flow chart illustrating the performance optimization of multiple applications sequentially based on the wireless communication system incorporating the adjustable antenna system.

FIG. 7 is a process flow chart illustrating the performance optimization of multiple applications sequentially based on the wireless communication system 400 incorporating the adjustable antenna system 402. In the step 704, the multiple applications are managed based on certain preferences and priorities. Information related to the preferences and priorities, based on, for example, a use history, user's inputs, applications settings, rules and conditions, and a preferred sequence of certain applications, may be pre-stored or acquired during use. The information can be made available for an application manager incorporated in the application processor, for example. Based on the information, a specific application is selected. The optimization of performance of the selected application is carried out in the step 708, which corresponds to the steps 604, 608, 612, 616 and 620 in FIG. 6. Information related to the preference and priority is monitored in the step 712. Unless a change in priority or preference occurs in the step 716, the system stays on the network connection and the application as indicated by the step 720. If a change is detected, the process goes back to the managing step 704 to select another application based on the new preference or priority.

What is claimed is:

1. A wireless communication system, comprising;
an application processor comprising a logic section;
a plurality of peripheral elements coupled to the application processor; and
an antenna system coupled to two or more of the plurality of peripheral elements, the antenna system comprising a plurality of antennas including one or more modal antennas, at least one of said modal antennas including a radiating element positioned above a circuit board forming an antenna volume therebetween, a first parasitic element coupled to a first active element, the first parasitic element positioned outside of the antenna volume and adjacent to the radiating element for steering the antenna beam direction, and a second parasitic element coupled to a second active element, the second parasitic element positioned within the antenna volume for adjusting a frequency response of the modal antenna, wherein each of the one or more modal antennas is configurable in one of a plurality of possible antenna modes, with each of the modes corresponding to one of a plurality of radiation patterns associated with the modal antenna, respectively;
wherein
the logic section is configured to control the antenna system to have a configuration that optimizes gain associated with networks and performance of an application selected for a time period.

2. The wireless communication system of claim 1, wherein the antenna system further comprises an antenna logic section that communicates with the logic section, and is associated with an RF circuitry that is coupled to the two or more of the plurality of peripheral elements and to the plurality of antennas.

3. The wireless communication system of claim 2, wherein the application processor further comprises a plurality of interfaces coupled to the plurality of peripheral elements, respectively, and one or more processors, wherein the logic section receives information from the plurality of interfaces, the one or more processors and the antenna logic section, and based on the information the logic section controls the antenna system to have the configuration that optimizes the gain associated with the networks and the performance of the application selected for the time period.

4. The wireless communication system of claim 3, wherein the logic section controls the antenna system by controlling components in the RF circuitry to adjust one or more of properties including signal frequencies and impedances.

5. The wireless communication system of claim 3, wherein the logic section controls the antenna system by selecting a mode from each of the one or more modal antennas.

6. The wireless communication system of claim 3, wherein the logic section receives at least part of the information on wireless communication factors including the networks, environment and antenna characteristics.

7. The wireless communication system of claim 3, wherein the logic section receives at least part of the information based on one or more of channel quality metrics including data rate, signal-to-noise ratio, received signal strength indicator, signal-to-interference-plus-noise ratio, and throughput.

8. The wireless communication system of claim 6, wherein the two or more of the plurality of peripheral elements comprise two or more basebands associated with the networks, respectively, the networks including two or more of LAN, WAN, PAN, and GPS.

9. The wireless communication system of claim 6, wherein the antenna logic section is configured to store the antenna characteristics including at least part of radiation patterns, directivity and efficiency of each of the plurality of antennas, and coupling coefficients between antennas.

10. The wireless communication system of claim 6, wherein
the plurality of peripheral elements comprise one or more sensors that detect at least part of the environment.

11. The wireless communication system of claim 1, wherein
the logic section is configured to control the antenna system to have the configuration that optimizes the gain associated with networks by testing a plurality of configurations of network connections.

12. The wireless communication system of claim 1, wherein
the application is one of video streaming and digital media downloading, wherein based on information from a video processor the logic section is configured to control the antenna system to have the configuration that optimizes the performance of the application by selecting a mode associated with one of the one or more modal antennas during each time interval to have a reliable link for obtaining a fluid media stream.

13. The wireless communication system of claim 1, wherein
the application is a game, wherein
based on information from one or both of a video processor and an image processor, the logic section is configured to control the antenna system to have the configuration that optimizes the performance of the application by selecting a mode associated with each of the one or more modal antennas to reduce coupling to the antenna used for the application for optimizing interaction between the game and a user.

14. A method of optimizing performance of an application on a wireless communication system, comprising steps of:
providing an antenna system comprising a plurality of antennas including one or more modal antennas, at least one of said modal antennas including a radiating element positioned above a circuit board forming an antenna volume therebetween, a first parasitic element coupled to a first active element, the first parasitic element positioned outside of the antenna volume and adjacent to the radiating element for steering the antenna beam direction, and a second parasitic element coupled to a second active element, the second parasitic element positioned within the antenna volume for adjusting a frequency response of the modal antenna, wherein each of the one or more modal antennas is configurable in one of a plurality of possible antenna modes, with each of the modes corresponding to one of a plurality of radiation patterns associated with the modal antenna, respectively;
receiving information on wireless communication factors including networks, environment and antenna characteristics;
first configuring the antenna system based on at least part of the information to use a network connection that optimizes gain;
monitoring the performance of the application based on feedback information; and
second configuring the antenna system based on at least part of the feedback information to optimize the performance of the application.

15. The method of claim 14, further comprising a step of:
repeating the receiving, first configuring, and second configuring steps if a change in performance is detected in the monitoring step.

16. The method of claim 14, further comprising a step of:
repeating the second configuring step if a change in performance is detected in the monitoring step.

17. The method of claim 14, wherein
the networks include two or more of LAN, WAN, PAN, and GPS.

18. The method of claim 14, further comprising a step of:
storing the antenna characteristics including at least part of radiation patterns, directivity and efficiency of each of the plurality of antennas, and coupling coefficients between antennas.

19. The method of claim 14, further comprising a step of:
sensing at least part of the environment.

20. The method of claim 14, wherein
the antenna system is associated with an RF circuitry coupled to the plurality of antennas; wherein
one or both of the first configuring and second configuring steps comprise controlling components in the RF circuitry to adjust one or more of properties including signal frequencies and impedances.

21. The method of claim 14, wherein
one or both of the first configuring and second configuring steps comprise selecting a mode from each of the one or more modal antennas.

22. The method of claim 14, wherein
the feedback information comprises channel quality metrics including one or more of data rate, signal-to-noise ratio, received signal strength indicator, signal-to-interference-plus-noise ratio, and throughput.

23. The method of claim 14, wherein
the first configuring comprises testing a plurality of configurations of network connections to have the configuration that optimizes the gain associated with the networks.

24. The method of claim 14, wherein
the application is one of video streaming and digital media downloading, wherein
the second configuring comprises selecting a mode associated with one of the one or more modal antennas during each time interval to have a reliable link for obtaining a fluid media stream based on the feedback information from a video processor.

25. The method of claim 14, wherein
the application is a game, wherein
the second configuring comprises selecting a mode associated with each of the one or more modal antennas to reduce coupling to the antenna used for the application for optimizing interaction between the game and a user based on the feedback information from one or both of a video processor and an image processor.

26. A method of optimizing performance of a plurality of applications sequentially on a wireless communication system, comprising steps of:
managing the plurality of applications based on first information on one or more of priorities and preferences to select an application for a time period;
first monitoring the first information;
providing an antenna system comprising a plurality of antennas including one or more modal antennas, at least one of said modal antennas including a radiating element positioned above a circuit board forming an antenna volume therebetween, a first parasitic element coupled to a first active element, the first parasitic element positioned outside of the antenna volume and adjacent to the radiating element for steering the antenna beam direction, and a second parasitic element coupled to a second active element, the second parasitic element positioned within the antenna volume for adjusting a frequency response of the modal antenna, wherein each of the one or more modal antennas is configurable in one of a plurality of possible antenna modes, with each of the modes corresponding to one of a plurality of radiation patterns associated with the modal antenna, respectively;
receiving second information on wireless communication factors including networks, environment and antenna characteristics;
first configuring the antenna system based on at least part of the second information to use a network connection that optimizes gain;

second monitoring the performance of the application based on third information; and second configuring the antenna system based on at least part of the third information to optimize the performance of the application.

27. The method of claim 26, further comprising a step of:
repeating the receiving, first configuring, and second configuring steps if a change in performance is detected in the second monitoring step.

28. The method of claim 26, further comprising a step of:
repeating the second configuring step if a change in performance is detected in the second monitoring step.

29. The method of claim 26, further comprising a step of:
repeating the managing step if a change in the first information is detected in the first monitoring step.

30. The method of claim 26, wherein
one or both of the first configuring and second configuring steps comprise selecting a mode from each of the one or more modal antennas.

31. The method of claim 26, wherein
the preferences and the priorities are based on one or more of a use history, user's inputs, applications settings, rules and conditions, and a predetermined sequence of two or more of the applications.

32. The method of claim 26, wherein
the third information comprises channel quality metrics including one or more of data rate, signal-to-noise ratio, received signal strength indicator, signal-to-interference-plus-noise ratio, and throughput.

* * * * *